United States Patent [19]

Hill

[11] Patent Number: 5,269,689

[45] Date of Patent: Dec. 14, 1993

[54] METHOD FOR TEACHING KEYBOARDING

[76] Inventor: Dorothe M. Hill, 6329 McRay Dr., Pineville, La. 71360

[21] Appl. No.: 952,328

[22] Filed: Sep. 28, 1992

[51] Int. Cl.⁵ .............................................. G09B 13/00
[52] U.S. Cl. .................................................... 434/227
[58] Field of Search .............. 434/219, 227, 231, 232

[56] References Cited

U.S. PATENT DOCUMENTS 2,802,284  8/1957  Dreisonstok et al. ............... 434/227
3,898,748  8/1975  Flanders .......................... 434/227 X
4,580,984  4/1986  Madaus .............................. 434/227

Primary Examiner—Gene Mancene
Assistant Examiner—Jeffrey A. Smith
Attorney, Agent, or Firm—Rod Bryant Jordan

[57] ABSTRACT

A process of teaching the use of keyboards thereby enabling keyboard operators to produce large quantities of printed material in a much shorter time at higher accuracy. The process instructs keyboard students to associate printed material with four specific finger movements rather than keyboard memorization, thereby securing proficiency for keyboard students in as little as four hours rather than the usual six to thirty six weeks.

6 Claims, 1 Drawing Sheet

METHOD FOR TEACHING KEYBOARDING

BACKGROUND OF THE INVENTION

The present invention relates to a process of quickly and effectively training individuals in the use of keyboards. Since the advent of the typewriter the ability to type, which is of course the use of a keyboard, has been a valuable and essential skill. In today's computer age of word processing the efficient use of keyboards is even more important. As the demand for able keyboard operators and typist has increased, it is apparent that a new and more efficient approach to the training of these operators must be found. It is this need that the present invention addresses.

DESCRIPTION OF THE PRIOR ART

Previously, the skill of keyboard operating was taught as a simple exercise in memorization. The keyboard was memorized with certain fingers assigned to certain keys. This method requires that the operator concentrate on each key's location rather than an automatic reaction to the material being keyed in. Mechanical attachments have been designed that forced certain fingers to react to certain keys. These devices did nothing in regard to acquisition of speed. The present invention relates to a method of keyboard learning that is based upon four specific typing patterns. This method is capable of teaching skills in a matter of hours that would require weeks under ordinary techniques.

SUMMARY OF THE INVENTION

Directional keybording is based upon the learning of four typing patterns: left/right, up/down, down/up, and up/up. These patterns could be applied to any keyboard application the method is explained with regard to the QWERTY arrangement. The QWERTY arrangement, the most widely used keyboard, is only an example of the teaching patterns of these particular keyboard. These patterns could be applied to DVORACK, or any other arrangement. The computer or typewriter keyboard is the device by which these patterns are learned, just as one would use the alphabet to learn the sounds for words and thus words to read a book.

In teaching these patterns it is possible to learn, in four hours, the keyboard arrangement which usually takes four to six weeks or longer using standard methods. It is easy to learn these patterns with only a first-grade reading ability. Once these patterns are learned, practicing them for five minutes every day increases typing speed and accuracy on a continuing basis. Learning these patterns is the key to combining keys to make words.

BRIEF DESCRIPTION OF THE DRAWINGS

Figure one is a top elevation view of a QWERTY key board showing the keys that are assigned to each finger and the directions that the finger must take in activating each key.

DETAILED DESCRIPTION OF THE INVENTION

Figure 1:
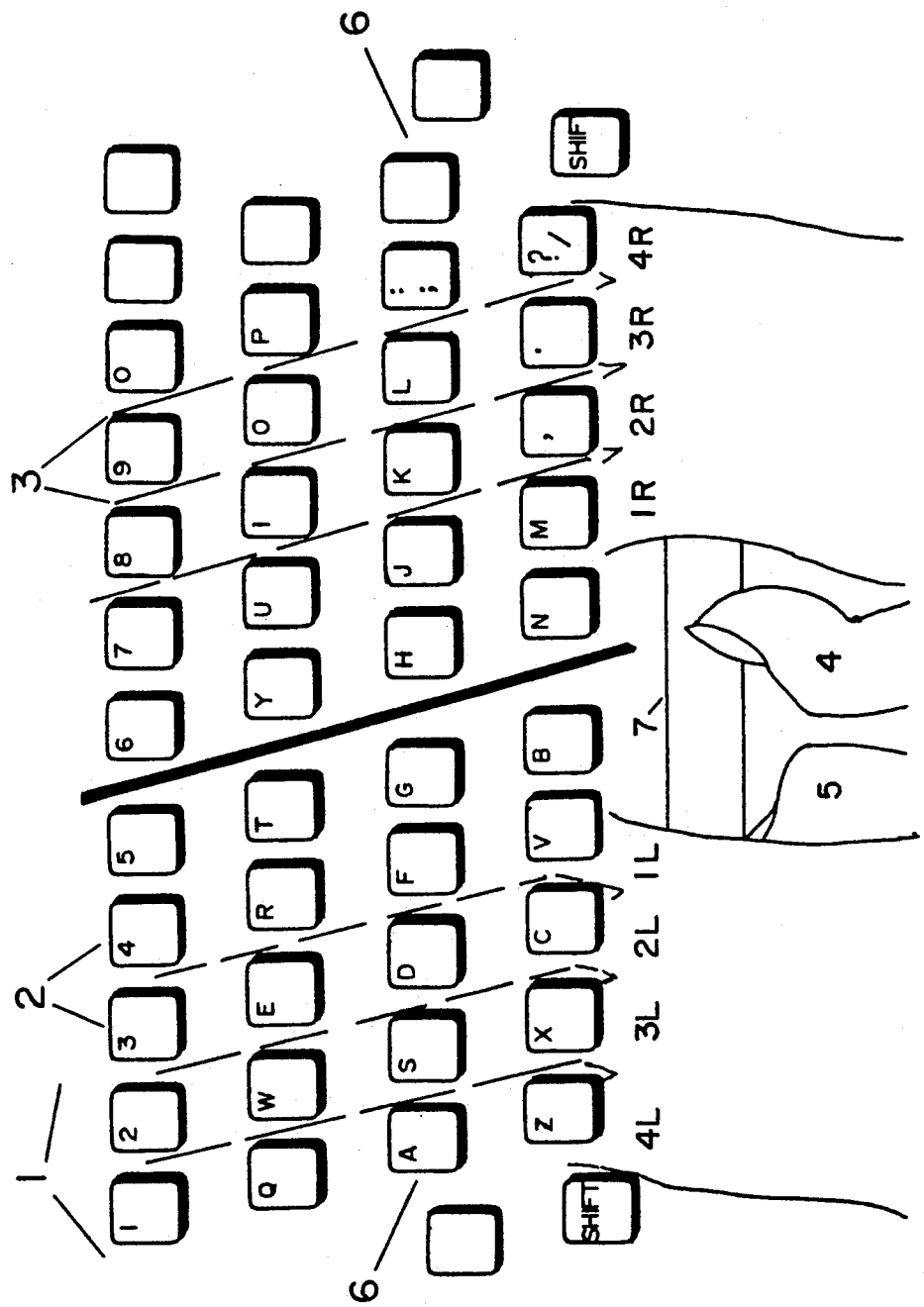

Referring to FIG. 1, it can be seen that a QWERTY key board 1 has had certain keys 2 assigned to certain fingers as designated by border lines 3. In this case the finger location is the standard typing key assignment. The instruction method being described would, however, be usable on any finger assignment, or for that matter any key board arrangement. As can be seen, the thumbs 4 and 5 are locked, and fingers 1L through 4L and 1R through 4R are curved. Elbows should be rested against the body. Fingers are placed on highlighted home row 6. Right thumb 4 is rested in a curved position on space bar 7. Left thumb 5 is curved under left forefinger 1L so that the knuckles of each thumb can touch. Space bar 7 is activated by striking with the left edge of right thumb 4. The assigned keys for each finger are activated by stretching, bending, and reaching of each individual finger. Each finger is trained to move in certain patterns.

There are four basic patterns of movement. They are LEFT/RIGHT, UP/DOWN, DOWN/UP, AND UP/UP. These patterns must be learned in separate repetitive steps.

The LEFT/RIGHT pattern is learned as follows:

While stroking keys F (Left), J (right), D (left), K (right), S (left), L (right), A (left), and ; (right), G (left) and H (right), watch highlighted keyboard or keyboard chart and count 1, 2, 3, 4, 5, space, as each key is stroked five times. The LEFT/RIGHT pattern is then formed by striking left fingers (ASDFG space) and (;LKJH space) to create eight 5-stroke "words" per line. Say left as the left-hand fingers strike the keys; say right as the right hand fingers strike the keys. Do not say letters, as these typing patterns are based upon an involuntary SEE/RESPOND process.

The UP/DOWN pattern is learned as follows:

While stroking keys AQZ SWX DEC FRV GTB HYN JUM KI, LO. and ;P/ watch highlighted keyboard or keyboard chart and say A UP/DOWN S UP/DOWN D UP/DOWN F UP/DOWN F OVER UP/DOWN J OVER UP/DOWN J UP/DOWN K UP/DOWN L UP/DOWN; UP/DOWN to create ten 4-stroke "words" per line. The striking of the space bar is included as one of the 4 strokes At this point the striking of the space bar has become an automatic response.

The DOWN/UP pattern is learned as follows:

While stroking keys AZQ SXW DCE FVR GBT HNY JMU K,I L.O ;/P watch highlighted keyboard 1 and say A DOWN/UP S DOWN/UP D DOWN/UP F DOWN/UP F OVER DOWN/UP J OVER DOWN/UP J DOWN/UP K DOWN/UP L DOWN/UP ; DOWN/UP to create ten 4-stroke "words" per line.

The UP/UP pattern is learned as follows:

While stroking keys AQ1 SW2 DE3 FR4 GT5 HY6 JU7 KI8 LO9 ;P0 watch keyboard chart and say A UP/UP S UP/UP D UP/UP F UP/UP, F OVER UP/UP J OVER UP/UP J UP/UP K UP/UP L UP/UP ; UP/UP to create ten 4-stroke "words" per line.

The simplicity of this method of keyboard learning and the immediate sense of speed and accuracy act as motivational devices in transferring the four learned patterns into involuntary responses allowing the production of words as fast as the keyboard operator's eyes see the words. It eliminates typing words by letters. For example, the formerly used methods teach keyboard students to say the letter and type (a-s) (h-a-d). The method disclosed herein creates an immediate response (as) (had) without requiring the student to say each letter of a word. Just the word is said. In four hours the entire keyboard is accessible to the student, whereas, using other methods, total keyboard accessibility requires weeks. In four hours, it is just as easy to type letters on the two rows above the home row and the one row below the home row as it is to type on home row keys.

It is submitted that a flexible warm up performed for five minutes each day can result in high accuracy and a speed limited only by a persons physical abilities. This process teaches keyboarding by emphasizing an automatic movement toward the proper keys by the fingers as directed by a learned relationship between letters and finger movement rather than simply memorizing individual key locations.

I claim:

1. A method of teaching a pupil the efficient use of keyboards resulting in greater speed and accuracy in a shorter instruction time through more efficient use and positioning of hands, thumbs, elbows, and fingers, said method based upon the learning of specific patterns of movement rather than keyboard memorization, said method comprising instructing said pupil to attain a proper position with respect to said key board, assigning specific keys of said keyboard to certain of said fingers, instructing said pupil to move each of said fingers in one of four specific patterns while reciting specific words and phrases, instructing said pupil to learn each of said four patterns in separate repetitive steps by performing a drill exercise specifically designed for each said pattern, and instructing said pupil to repeat said drill at specific intervals, wherein said four specific patterns comprise LEFT/RIGHT, UP/DOWN, DOWN/UP, AND UP/UP, said patterns corresponding to the movement of said fingers.

2. A method as recited in claim 1, wherein said method of teaching said LEFT/RIGHT pattern comprises instructing said pupil to, stroke said keys F (Left), J (right), D (left), K (right), S (left), L (right), A (left), and ; (right), G (left) and H (right), watch said keyboard or a chart depicting said keyboard, count 1, 2, 3, 4, 5 as each said key is stroked five times, strike said left finger keys (ASKFG space) and (;LKJH space) to create eight 5 stroke "words" per line, verbally say left as said left hand fingers strike said keys, and verbally say right as said right hand fingers strike said keys, refraining from saying letters so that said typing patterns are based upon an involuntary SEE/RESPOND process.

3. A method as recited in claim 2, wherein said method of teaching said UP/DOWN pattern comprises instructing said pupil to, strike said keys AQZ SWX DEC FRV GTB HYN JUM KI, LO. and ;P/, watch said keyboard or a chart depicting said keyboard, and verbally say A UP/DOWN S UP/DOWN D UP/DOWN F UP/DOWN F OVER UP/DOWN J OVER UP/DOWN J UP/DOWN K UP/DOWN L UP/DOWN ; UP/DOWN so as to create ten 4-stroke "words" per line.

4. A method as recited in claim 3, wherein said method of teaching said DOWN/UP pattern comprises instructing said pupil to, stroke said keys AZQ SXW DCE FVR GBT HNY JMU K,I L.O ;/P , watch said keyboard or a chart depicting said keyboard, and verbally say A DOWN/UP S DOWN/UP D DOWN/UP F DOWN/UP F OVER DOWN/UP J OVER DOWN/UP J DOWN/UP K DOWN/UP L DOWN/UP ; DOWN/UP in order to create ten 4-stroke "words" per line.

5. A method as recited in claim 4, wherein said method of teaching said UP/UP pattern comprises instructing said pupil to, stroke said keys AQ1 SW2 DE3 FR4 GT5 HY6 JU7 KI8 LO9 ;P0 , watch said keyboard or a chart depicting said keyboard, and verbally say A UP/UP S UP/UP D UP/UP F UP/UP F OVER UP/UP J OVER UP/UP J UP/UP K UP/UP L UP/UP ; UP/UP in order to create ten 4-stroke "words" per line.

6. A method as recited in claim 5, wherein said specific intervals further comprise one five minute session on a daily basis.

* * * * *